Oct. 20, 1953  R. W. SIMPSON  2,655,704
SEPARABLE END CONNECTION FOR SLIDE FASTENERS
Filed Feb. 23, 1950
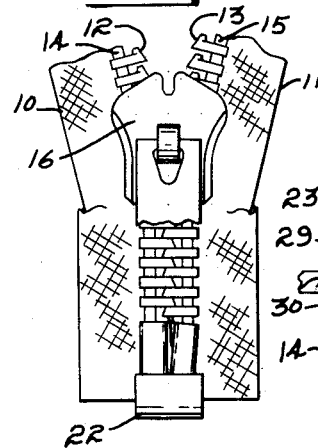
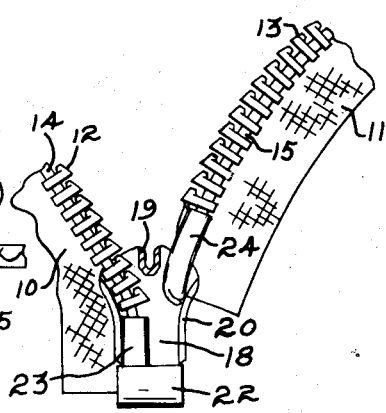
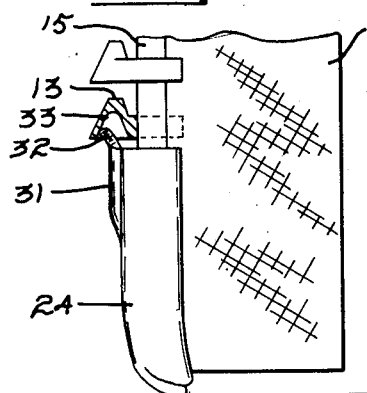
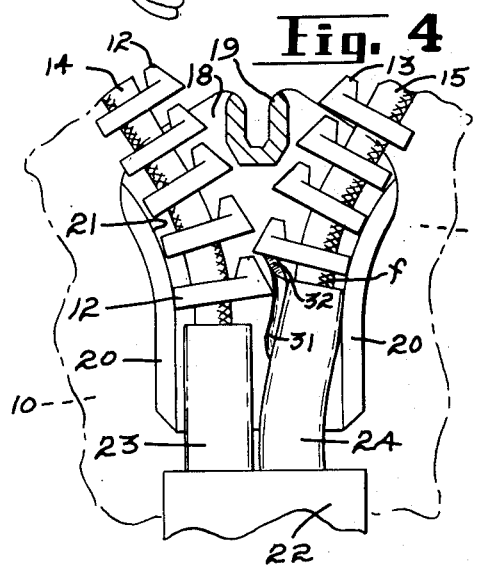
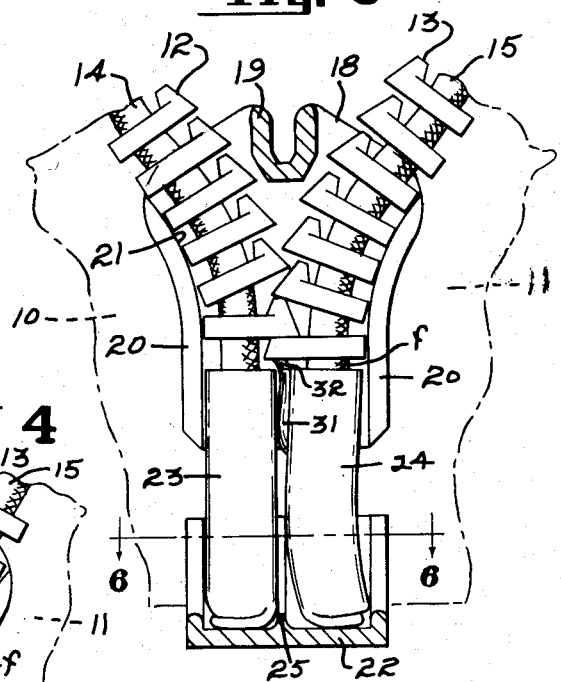
INVENTOR.
Richard W. Simpson
BY
H. F. Johnston
Attorney Patented Oct. 20, 1953

2,655,704

UNITED STATES PATENT OFFICE 2,655,704

SEPARABLE END CONNECTION FOR SLIDE FASTENERS

Richard W. Simpson, Waterbury, Conn., assignor to Scovill Manufacturing Company, Waterbury, Conn., a corporation of Connecticut Application February 23, 1950, Serial No. 145,811

4 Claims. (Cl. 24—205.11)

My invention relates to slide fasteners commonly known as zippers, and more particularly to separable end connections for such fasteners.

Slide fasteners as commonly used on jackets, sweaters and various other articles where complete separation is required, employ what is commonly called a separable bottom stop. Such separable bottom stops or connections consist essentially of a socket or retainer attached to one tape adjacent the end of one of the rows of fastener elements and a pin member attached to the other tape adjacent the other row of fastener elements. In assembling the parts, the pin is threaded through the slider into interfitted engagement with the socket or retainer. It is extremely important that the pin be inserted all the way home before the slider is pulled up to close the fastener. Otherwise the fastener is mismeshed and can be easily separated below the slider.

This problem has heretofore been only partially solved by providing an extra thickness, bulge or lateral projection on the face of the pin member which will abut the fastener elements on the opposite stringer and prevent the starting movement of the slider.

Now in the assembly of the pin member on the tape it is desirable to have some spacing between the pin and the endmost fastener element on that stringer to allow for some degree of flexing of the cord edge of the tape. If such flexibility is not provided, the cord is likely to become broken in use, or repeated strain will tend to separate the pin and fastener elements. With this condition in spite of bulges or projections heretofore provided on the pin member, the endmost fastener element on the socket or retainer side can enter into the space between the pin and its adjacent fastener element whereupon the slider can be pulled up before the pin member has been inserted all the way home. This results in an improper coupling of the pin and socket member which under flexing and strain will come apart. Also it tends to tilt or move the endmost fastener element on the pin side causing severe flexing and wear of the fabric at that point which may result in breakage of the cord edge.

My invention, by a simple and inexpensive device, eliminates the above danger by preventing mismeshing under all conditions and at the same time allowing the desired amount of flexibility between the pin and the adjacent fastener element. This is accomplished by the simple expedient of a horn or projection at the upper end of the pin extending preferably into the socket of the adjacent fastener element. This permits the desired amount of free cord or spacing between the pin and adjacent fastener elements while effectively blocking that space against entry of a fastener element on the retainer side. The engagement of the horn in the socket of the fastener element permits free hinging between the parts while at the same time supporting the endmost fastener against downward twisting forces.

One embodiment of the invention is described more in detail in the following specification and illustrated in the accompanying drawing.

In this drawing:

Fig. 1 is a front view of the bottom portion of a slide fastener equipped with my improved separable end connection.

Fig. 2 is a similar view to Fig. 1 with a slider in section and the stringer with the pin element partially removed from the socket.

Fig. 3 shows an enlarged view of the slider in section with the end connection assembled and the slider moved a short distance from the connection.

Fig. 4 is a view similar to Fig. 3 showing the pin partially disengaged from its socket and illustrating how my improved device prevents mismeshing.

Fig. 5 is a front view of the pin member and stringer showing the adjacent fastener element in section, and Fig. 6 is a cross sectional view through the end connection along the line 6—6 of Fig. 3.

The slide fastener illustrated comprises a pair of flexible tapes 10 and 11 having a series of cooperating fastener elements 12 and 13 attached to their adjacent longitudinal beaded or cord edges 14 and 15, and a slider 16 for engaging and disengaging the elements.

The slider comprises front and back wing portions 18 integrally connected together at one end by a neck 19. The wings 18 are provided with inturned flanges 20 at their outer edges to define a Y-shaped interior channel 21.

For convenience in description and in the claims the end of the slide fastener having the separable connection is referred to as the bottom or lower end although it will be understood that in some cases where the fastener is used in other positions it may actually not be the bottom end.

The separable bottom stop or end connection at the lower end of the fastener comprises a retainer or socket 22, clamped upon a tubular member 23 which has previously been attached to the beaded edge 14 of the stringer 10, and a pin member 24 clamped around the cord or beaded edge 15 of the other stringer. As best shown in Fig. 6, the socket 22 is provided with opposed mid ribs 25 and inwardly directed end flanges 26, thus dividing the interior of said clamp 22 into two channels 27 and 28. The tubular member 23 is permanently anchored in the left channel 27 by means of lugs 29 struck inwardly from the adjacent flanges 26 and engaging shoulders 30 formed on the edges of the tubular member 23. The pin 24 is somewhat smaller in cross sectional area than the right channel 28 so as to have free telescopic engagement therein.

The outer wall of the pin 24 is formed with an outwardly projecting rib or bulge 31 adjacent the upper end of said pin 24. This rib or bulge 31 will prevent starting movement of the slider when the fastener elements on the retainer side strike against it because the combined width of the pin at the bulge point and the fastener element is greater than the width of the slider channel at its lower end. It is desirable to space both the pin and retainer members quite close to the adjacent elements but nevertheless to leave a certain amount of free or exposed cord f. This permits flexing between the end members and the adjacent fastener elements so as to prevent undue tearing strains coming on the fabric parts of the fastener, and also preventing any tendency for slippage of the fastener elements on the cord edge. However, in previous separable bottom stops either the spacing was kept too close or there is likelihood of mismeshing by reason of the endmost fastener element on the retainer side wedging itself into the space between the pin and adjacent fastener member.

According to my invention the danger of mismeshing is prevented by the simple expedient of a horn or lug 32 projecting upwardly from the pin member 24 and extending preferably at an angle outwardly from the tape and upwardly into the pocket or recess 33 of the adjacent fastener element 13. Preferably also the end of the horn 32 contacts the inclined front wall of the recess or pocket 33. This horn 32 blocks the entrance to the space between the pin member and fastener element and such space can be as much as desired to allow proper flexing of the fabric at that point. Furthermore, the horn forms a support for the fastener element to prevent it from twisting or slipping on the tape, and during any flexing of the tape the horn will rock or hinge in the recess 33.

In the normal use of the fastener stringers, the slider will be mounted on the left stringer tape 10. In making a connection of the fastener elements the slider 16 will be slid to its lowermost position with its lower edge abutting the upper edge of the retainer 22. In this position of the slider the pin 24 on opposite tape 11 may be readily guided down the Y channel 21 and fully telescoped into the retainer recess 28, after which the slider 16 may be drawn upwardly to interconnect the elements 12 and 13 in the usual manner.

If perchance the operator should neglect to completely assemble the pin member 24 into the retainer recess 28, it would be impossible to draw the slider upwardly and have the complemental elements 12 and 13 on the stringers interconnected in a mismeshed condition by reason of the rib 31 and lug 32 located on pin member 24 as shown in Fig. 4. This blocking of the slider 16 is accomplished by reason of the fact that one or more of the heads of the lowermost elements 12 on tape 10 will abut against the rib 31 or the lug 32 and thus prevent the complemental elements 12 and 13 from intermeshing.

In a case like that shown in Fig. 4 where the endmost fastener element on the retainer side has its wedge-shaped end in line with the space between the pin member 24 and adjacent fastener element, mismeshing will nevertheless be prevented because the horn 32 extending all the way into the pocket 33 of the fastener element will prevent such wedging action and block the slider against movement.

By reason of the angular relationship of the lug 32 to the rib 31, if, perchance, the pin 24 is not completely assembled into the retainer recess 28, then the head of any element 12 on top 10 disposed below the adjacent element 13 on opposite tape 11 would engage the inclined surface of the lug 32 and rather than force the head of the element 12 upwardly against the head of said adjacent element, the inclined surface of lug 32 will force or cam the opposing element head downwardly upon the rib 31.

As a result of my invention it will be apparent that without any appreciable additional cost, I have provided an improved separable end connection which will prevent mismeshing under all conditions and which, nevertheless, allows for free flexing movement between the pin member and adjacent fastener elements.

While I have shown and described in this application one embodiment which my invention may assume in practice, it will be understood that this embodiment is merely for the purpose of illustration and description, and that various other forms may be devised within the scope of this invention as set forth in the appended claims.

I claim:

1. A slide fastener comprising a pair of tapes, cooperating rows of fastener elements on adjacent edges of the tapes, a slider movable along the elements for opening and closing the fastener, a separable end connection comprising a retainer attached to one stringer adjacent the row of fastener elements and a pin member on the other stringer insertable through the slider into engagement with said retainer, said pin member being located so that there is some exposed cord between the pin and the adjacent fastener member to permit flexing between those parts, and a horn projecting upwardly and forwardly from the pin member into relatively movable engagement with the head of the adjacent fastener element.

2. A slide fastener comprising a pair of beaded edge tapes, complementary rows of fastener elements attached to the beaded edges of said tapes, each such element having a head portion projecting beyond the edge of the tape which includes a downwardly facing recess, a slider movable along the elements for opening and closing the fastener, a separable bottom end connection comprising a retainer attached to one stringer adjacent the row of fastener elements and a pin member attached around the beaded edge of the other stringer closely adjacent to but spaced from the endmost fastener element on that stringer, said pin member being insertable through the slider into engagement with said retainer, and means for preventing starting movement of said slider until said pin member is inserted all the way home comprising a bulge on the forward face of the pin, and an upward projection from said bulge engaging against the underside of the endmost fastener element on its stringer, said upward projection blocking the space between said endmost element and the pin member to prevent a fastener element on the other stringer from entering between them.

3. A slide fastener as defined in claim 2 wherein said upward projection terminates in the downwardly facing recess of the adjacent fastener element.

4. A slide fastener as defined in claim 2 wherein said upward projection inclines upwardly and outwardly from said bulge at such an angle that the heads of the fastener elements on the opposite stringer will be caused to cam downwardly toward said bulge when engaged by said projection.

RICHARD W. SIMPSON.

References Cited in the file of this patent

UNITED STATES PATENTS

| Number | Name | Date |
|---|---|---|
| 2,267,079 | Clark | Dec. 23, 1941 |
| 2,463,937 | Austin | Mar. 8, 1949 |
| 2,502,885 | Poux | Apr. 4, 1950 |